US009442777B2

United States Patent
Thayer et al.

(10) Patent No.: US 9,442,777 B2
(45) Date of Patent: Sep. 13, 2016

(54) NON-BLOCKING COMMUNICATION BETWEEN AN APPLICATION AND A SERVER

(75) Inventors: Karen E. Thayer, Fort Collins, CO (US); Jeffrey J. Walls, Fort Collins, CO (US); Jerald C. Fisher, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1834 days.

(21) Appl. No.: 12/533,485

(22) Filed: Jul. 31, 2009

(65) Prior Publication Data

US 2011/0029595 A1 Feb. 3, 2011

(51) Int. Cl.
*G06F 15/16* (2006.01)
*G06F 9/54* (2006.01)

(52) U.S. Cl.
CPC ........... *G06F 9/54* (2013.01); *G06F 2209/541* (2013.01)

(58) Field of Classification Search
CPC .......................... H04L 67/42; H04L 67/2842
USPC .................... 709/203, 228, 227, 213
See application file for complete search history.

(56) References Cited

U.S. PATENT DOCUMENTS

| 7,506,026 B1 * | 3/2009 | Lance et al. .................. 709/203 |
| 2002/0035605 A1 * | 3/2002 | McDowell et al. .......... 709/206 |
| 2008/0127206 A1 * | 5/2008 | Leonov et al. ............... 719/313 |
| 2009/0328059 A1 * | 12/2009 | Haba ............................ 719/312 |

* cited by examiner

*Primary Examiner* — Joon H Hwang
*Assistant Examiner* — Sherman Lin
(74) *Attorney, Agent, or Firm* — HP Inc. Patent Department

(57) ABSTRACT

A system and method for providing non-blocking communication with a communications server are disclosed herein. A computer system includes one or more processors and a software system executable by the processor. When executed, the software system provides an application thread and additionally provides a server communication thread configured to provide non-blocking communication between the application thread and a communication server. The server communication thread is configured to process commands based on requests for communication server services generated by the application thread. The server communication thread is further configured to communicate with the communication server based on the commands and to block pending a server response. The application thread is configured to execute unimpeded by the communication.

18 Claims, 3 Drawing Sheets

NON-BLOCKING COMMUNICATION BETWEEN AN APPLICATION AND A SERVER

BACKGROUND

Numerous different electronic communication services are available to facilitate transfer of business and/or personal information. Some communication services provide real-time data transfer. Telephony, video conferencing, instant messaging, etc. are examples of communication services capable of providing real-time information transfer. Other communication services, such as email, allow for communication at a rate determined by a message recipient. Some communication services may allow a user to select from several available modes of communication based on the availability of an intended recipient of an information transfer. Such systems can track the availability of parties with whom a user may desire to communicate and provide the availability information to the user.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
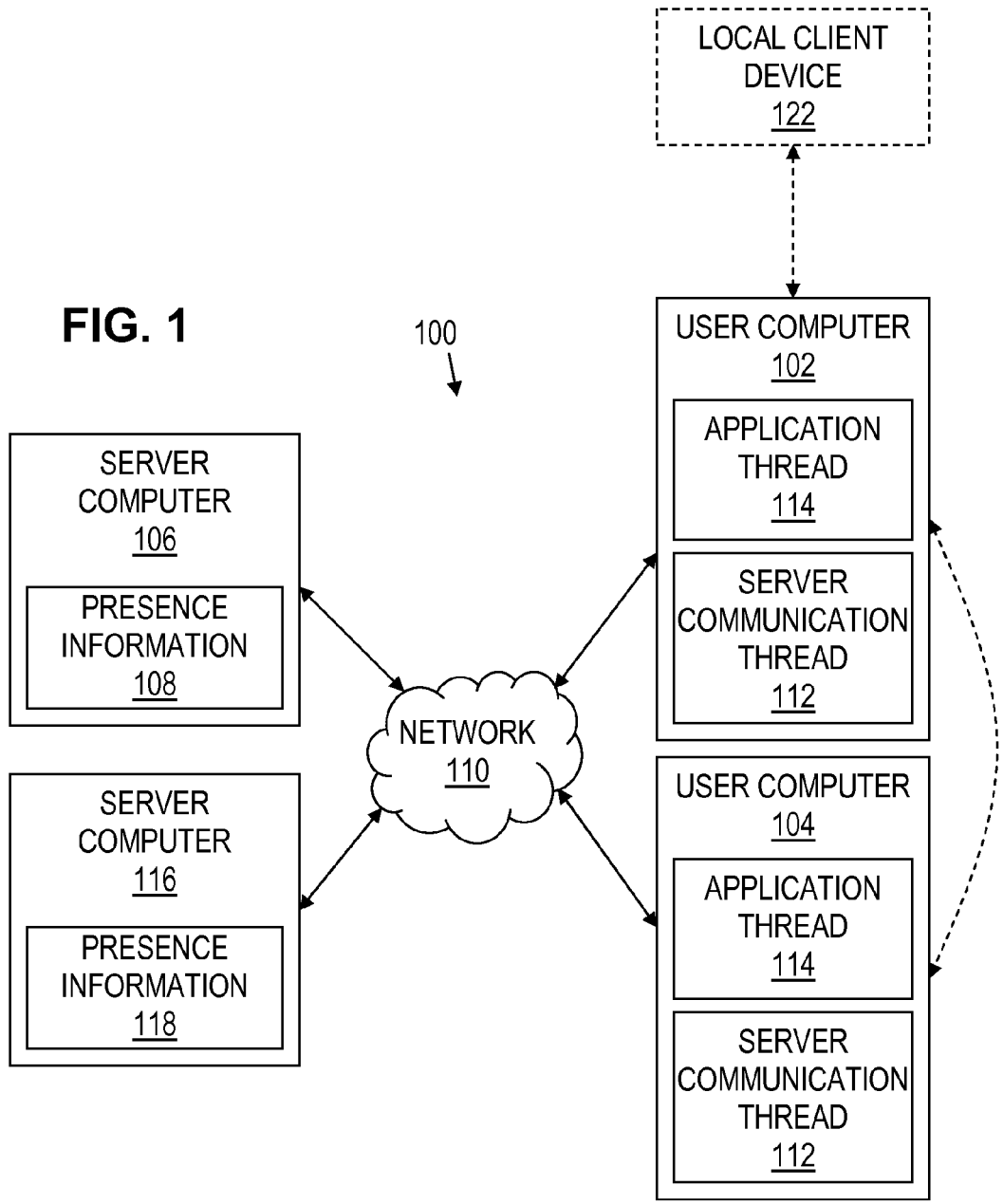
FIG. 1 shows a block diagram of a system that uses presence information provided by a server in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. More generally, coupling may refer to a physical or logical connection of components. Further, the term "thread" refers to a sequence of computer instructions including some independent state information, executable in parallel (or apparently in parallel) with other such instruction sequences.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various communication systems provide presence information that allows a user of the system to determine whether other individuals are available and/or willing to communicate. The presence information may take the form of a contact list, sometimes called a "buddy list," that catalogs friends, colleagues, associates, etc. of the user. The parties represented in the contact list are generally chosen by the user as persons with whom the user may wish to communicate using a communication mode offered by the system. The contact list can provide information regarding each party's availability, for example, a party may be listed as having a presence status of available, busy, offline, inactive, etc. Based on the provided presence status, a user may select a particular communication mode for use with a listed individual. For example, a party having a presence status of available may be a candidate for application of a real-time communication mode such as video-conferencing, while a party having a presence status of offline may be candidate for use of a non-real-time communication mode such as email.

Office Communications Server from Microsoft® ("MSOCS") is an example a communication system that provides presence information with regard to a user's contacts. An application that interoperates with MSOCS must provide a means to receive and process contact information provided by the server. One embodiment of an application that interoperates with the server uses an MSOCS client comprising a message pump (i.e., a program loop that receives messages from a client thread's message queue and provides the messages to the thread for processing) in the application's main thread (e.g., a Microsoft Foundation Class application). Unfortunately, such embodiments block the execution of the main thread while waiting for a message from the server, and timing of server responses can vary considerably (e.g., from milliseconds to seconds). Embodiments of the present disclosure provide access to the server and thus to contact lists and associated presence information without blocking the main thread of an application.

FIG. 1 shows a block diagram of a system 100 that uses presence information 108 provided by a server computer 106 in accordance with various embodiments. The system 100 comprises user computers 102, 104, and a server computer 106 coupled via a network 110. The computers 102-106 may be, for example, desktop computers, notebook computers, rack-mounted servers, hand-held computer based devices, etc. Each computer 102-106 may include one or more processors (e.g., general-purpose microprocessors), storage systems (e.g., semiconductor memory, magnetic storage, optical storage, etc.), user interface systems (e.g., video processing and display, keyboard, mouse, touchscreen, etc.), networking systems (e.g., wired or wireless networking), and interconnecting buses. The various storage systems mentioned above, as well as storage media (e.g., optical or magnetic media) constitute computer-readable media by which programming (i.e., instructions) may be provided to the computers 102-106 for execution by the processor therein.

The network 110 coupling the computers 102-106 may comprise any available computer networking arrangement, for example, a local area network ("LAN"), a wide area network ("WAN"), a metropolitan area network ("MAN"), the internet, etc. Further, the network 104 may comprise any of a variety of networking technologies, for example, wired, wireless, or optical techniques may be employed. Accordingly, the components of system 100 are not restricted to any particular location or proximity to one another, but rather may be located at any distance from one another.

The user computers 102, 104 comprise programming that allows users of the user computers 102, 104 to communicate with one another. In some embodiments, the user computers 102, 104 may employ peer-to-peer communication in some communication modes, rather than communication directed through the server 106. The communication programming included on the user computers 102, 104 comprises an application thread 114, and a server communication thread 112. The application thread 114 and the server communication thread may be configured to operate in conjunction with, for example, a Microsoft® Windows® operating system.

To facilitate communication between the user computers 102, 104 the server computer 106 may store and provide presence information 108. In some embodiments, the presence information 108 may comprise a contact list (i.e., a buddy list) cataloging users (and corresponding presence status) with whom a user of the contact list may communicate. The presence information 108 may be based on presence information provided by the computers 102, 104. In some embodiments, a presence monitoring program executing on the computers 102, 104 may automatically collect and aggregate user presence status based on user activities. For example, the presence monitoring program may ascertain user presence based on keystrokes, pointer movement, telephone use, calendar information such as scheduled appointments, etc. Each of the computers 102, 104 can refer to the presence information 108 provided by the server 106 to determine the presence status of a user relative to the other computer 102, 104. Thus, if a user of the user computer 102 desires to initiate a communication with a user of the user computer 104, the presence information 108 transferred to the user computer 102 by the server 106 can provide an indication of the availability and willingness of the user of the user computer 104 to communicate.

The computer 102 may support a variety of communication modes. For example, the computer 102 may include programming allowing communication via telephony (e.g., voice over internet protocol ("VOIP")), video conferencing, and instant messaging. The presence information 108 may aggregate presence information pertinent to a user of the user computer 102 into a composite presence status value applicable to any number of communication modes available via the user computer 102. Such aggregation may prevent a user of the computer 104 from determining communication mode preferences of the user of user computer 102. For example, a user of the user computer 102 may prefer not to communicate via video conference, and therefore may desire to assert a not available status as to video conferencing while remaining available with regard to other communication modes. Aggregation of presence may result in assertion of not available presence status as to all communication when only not available as to video conferencing is desired. Embodiments of the present disclosure allow for distribution of presence status as to a specific communication application (e.g., video conferencing), thereby allowing a user to ascertain communication mode preferences of another user.

The user computer 102 may determine the availability of a user of the computer 104 by retrieving the presence information 108 from the server 106. Some embodiments of the application thread 114 may include a client comprising a message pump. Such embodiments issue a presence information request from the application thread 114 and wait for the server 106 to deliver the presence information or for expiration of a delivery timeout, thus blocking (i.e., suspending or impeding) execution of the application thread 114 until a response is received. Blocking application thread 114 execution pending delivery of presence information 108 is undesirable in some applications. Embodiments of the present disclosure include the server communication thread 112 in addition to the application thread 114. The server communication thread 112 communicates with both the application thread 114 and the server 106, and allows the application thread 114 to issue requests answerable by the server 106 and continue execution (i.e., not block pending a server response).

As shown in FIG. 1, some embodiments of the system 100 include a plurality of server computers 106, 116 configured to provide presence information 108, 118. The presence information 118 provided by the server 116 may be different from the presence information 108 provided by the server computer 106. The presence information 108 may indicate availability of different individuals than the presence information 118 and/or employ different protocols. For example, the presence information 108 may be configured for use with an MSOCS system while the presence information 118 may be configured for use with an Extensible Messaging and Presence Protocol ("XMPP") based system such as Jabber®.

Embodiments of the user computers 102, 104 can use both presence information 108 and presence information 118 to determine availability. Multiple server communication threads 112 may be included in a user computer 102 with each thread configured to communicate with a different server 106, 116, or retrieve a different set of presence information 108, 118. Thus, embodiments allow the application thread 114 to simultaneously retrieve and employ presence information 108, 118 of different types and/or from different sources without blocking.

In some embodiments, the user computer 102 may be local to the user. For example, the user computer 102 may be a notebook or desktop computer with which the user directly interacts (e.g., by typing on the computer 102 keyboard, viewing information provided on a display of the computer 102, etc.).

In some embodiments, the user computer 102 may be remote from the user. For example, the computer 102 may be a blade computer, a server computing session, or other computing platform or computing capability provided to the user for execution of application program including threads 112, 114. In such embodiments, the user may interact with the user computer 102 via a local client device 122 (e.g., a thin client, personal computer, etc.) configured to provide a communication capability used to communicate with user computer 102 and/or user computer 104. For example, if a video conference between the local client device 122 and a user of the user computer 104 is desired, then the local client device 122 can provide video capture and video display capability while other operations video conferencing operations are provided by the remote user computer 102. The user computer 102 may be coupled to the local client device 122 via a network, for example, the network 110 described above or equivalent.

Figure 2:
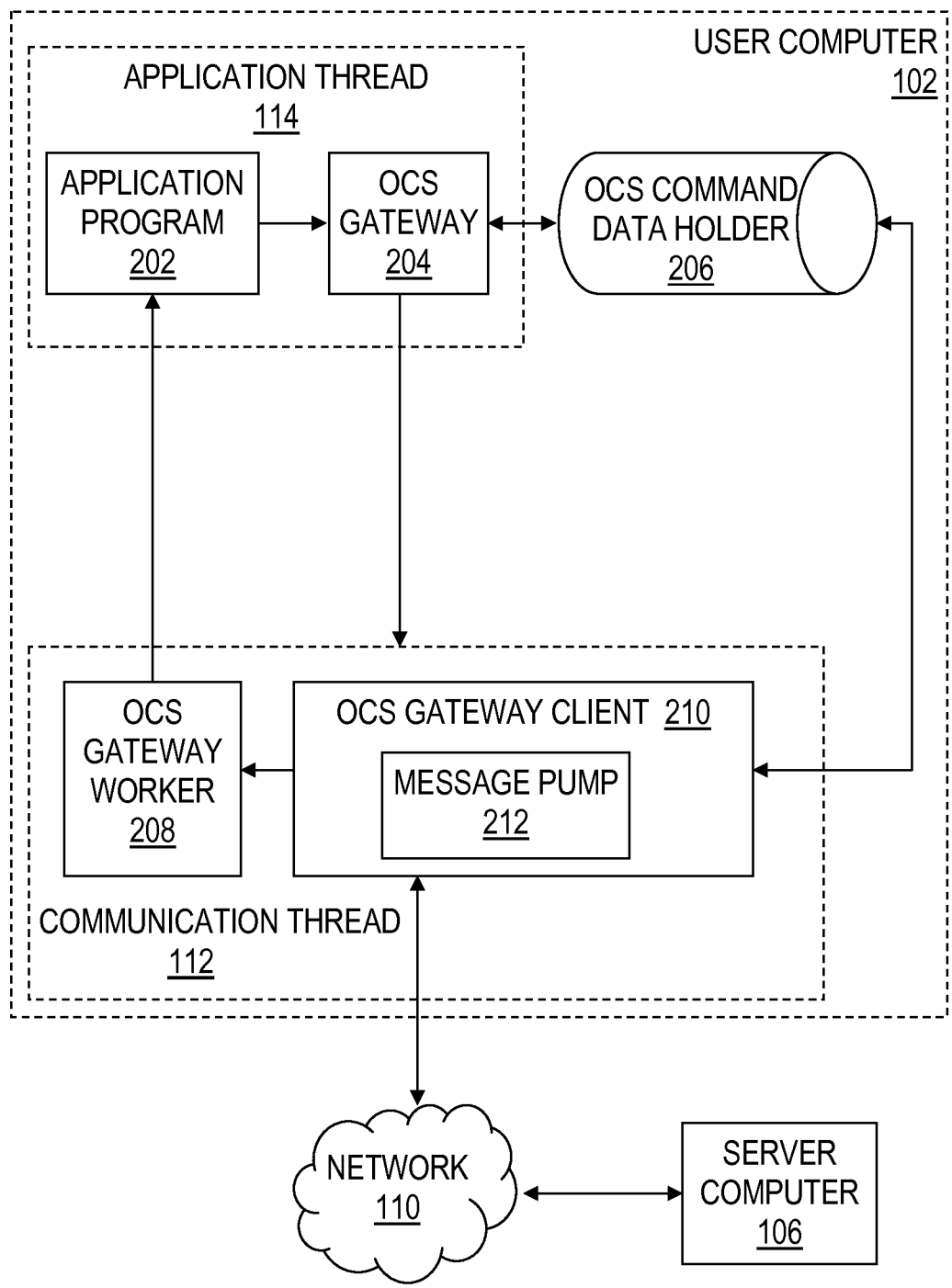
FIG. 2 shows a block diagram of a computer including a communication software system have a communication thread for retrieving presence information from a server in accordance with various embodiments.

FIG. 2 shows a block diagram of a portion of the system 100 including the server computer 106, the network 110, the user computer 102 and various components thereof. In the user computer 102, the application thread 114 comprises an application program 202, and a communication server ("OCS") gateway 204. The application program 202 includes the application logic (e.g., business logic, presentation logic, etc.) of the application thread 114. For example, the application program 202 may provide user interface functionality (e.g., generate displays and/or receive user input) and/or provide communication services allowing a user of the user computer 102 to communicate with a user of the user computer 104 (e.g., video conferencing services). The OCS gateway 204 provides an interface allowing the application program 202 to communicate with the server computer 106. More specifically, the OCS gateway 204 processes requests provided by the application program 202 for information stored on the server 106. OCS gateway 204 processing includes translating received requests into commands executable by the communication thread 112.

The communication thread 112 comprises an OCS gateway client 210 and an OCS gateway worker 208. The OCS gateway client 210 is configured to receive commands from the application thread 114, to generate server 106 requests based on the received commands, and to receive responses from the server 106. The OCS gateway client 210 includes a message pump 212. The message pump 212 reads server 106 response messages stored in a message queue associated with the message pump and dispatches the messages to the communication thread for processing. The OCS gateway client 210 may block while waiting for the server 106 to respond to request. The OCS gateway client 210 provides server responses to the OCS gateway worker 208 for delivery to the application program 202. In some embodiments, OCS gateway 204 executing in the application thread 114 launches the communication thread 112. The OCS gateway worker 208 processes responses to server 106 queries based on application program 202 requests and provides the responses to the application program 202.

To facilitate communication between the application thread 114 and the communication thread 112, the user computer 102 includes an OCS command data holder 206. The OCS command data holder 206 is a storage structure providing bidirectional communication between the threads 112, 114. The OCS command data holder 206 is configured to store commands generated by the OCS gateway 204 for execution by the communication thread 112, and status of command execution generated by the communication thread 206 for delivery to the OCS gateway 204. In some embodiments, the OCS command data holder 206 comprises a mutual exclusion mechanism (i.e., a mutex) for controlling access to the command data holder 206, and an array or list of pointers to commands or other command storage structure. In some embodiments, the OCS Command Data Holder 206 treats the commands as generic commands. Such embodiments have no intrinsic knowledge of the commands being processed; but simply manage the storage, receipt, and transmission of commands between the OCS Gateway 204 and the OCS Gateway Client 210.

The communication thread 112 polls the OCS command data holder 206 to determine whether the OCS gateway 204 has prepared a command for execution. When the communication thread 112 finds a command to be executed, the command is retrieved and if a return value to the application thread 114 is indicated, the communication thread 112 loads the return value into the OSC command data holder 206 for perusal by the OCS gateway 204. Return values may indicate status of command execution, for example, whether or not errors occurred during processing of a command.

Thus, embodiments of the present disclosure provide a secondary thread (i.e., the communication thread 112) that includes the OCS gateway client 210. Including the message pump 212 in the secondary thread allows for communication with the server 106 while providing non-blocking operation of the primary thread (i.e., the application thread 114). Thus, embodiments provide non-blocking communication between the application thread 114 and a server 106 providing presence information (i.e., execution of the application thread 114 is not suspended awaiting query responses from the server 106).

Some embodiments of the application thread 114 are configured to communicate with a plurality of servers by launching a number of communication threads 112. Each communication thread 112 is configured to communicate with a particular server and/or to receive a particular type of presence information. In such embodiments, the application program 202 can initiate a communication session based on presence information received from a number of different servers.

Figure 3:
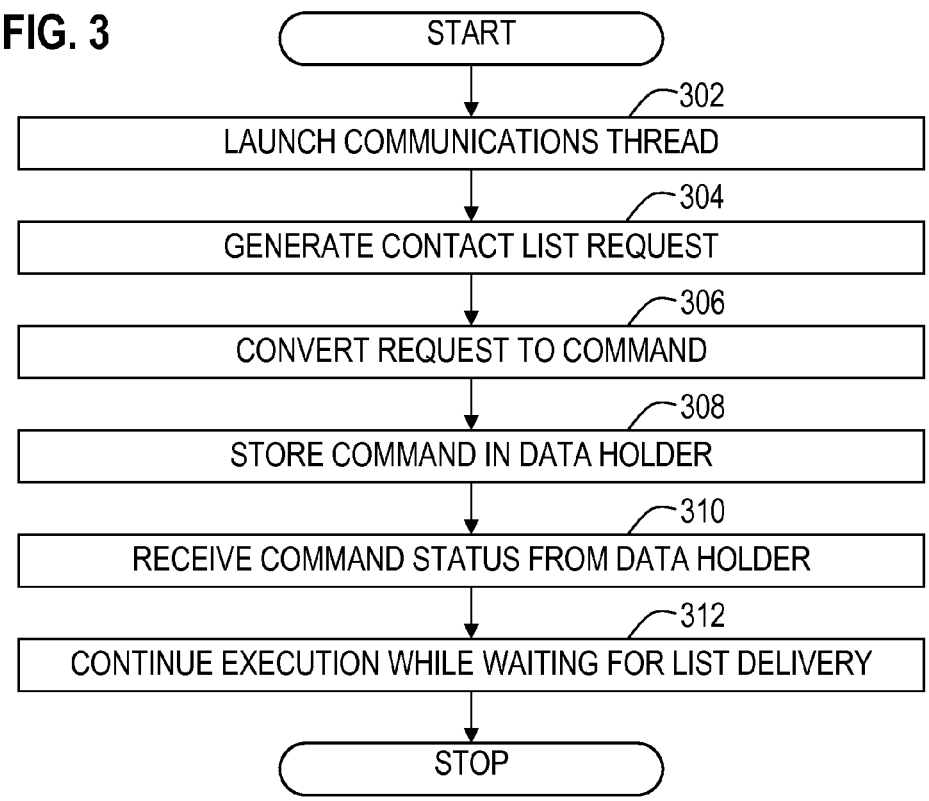
FIG. 3 shows a flow diagram for a method for retrieving presence information from a server via an non-blocking application thread in accordance with various embodiments.

FIG. 3 shows a flow diagram for a method for retrieving presence information from a server computer 106 via a non-blocking application thread 114 in accordance with various embodiments. Though depicted sequentially as a matter of convenience, at least some of the actions shown can be performed in a different order and/or performed in parallel. Additionally, some embodiments may perform only some of the actions shown. At least some of the operations shown can be implemented as instructions provided in the application thread 114 software executed by one or more processors included in the user computer 102.

In block 302, the application thread 114 is executing. The application program 202, which includes the logic of the application, may be providing or preparing to provide user interface or other services. The OCS gateway 204 launches the communication thread 112. The OCS gateway client 210 executes in the communication 112 thread rather than the application thread 114. Some embodiments launch a plurality of communication threads 112, each communication thread 112 configured to communicate with a different communication server and/or to receive a different types of presence information.

In block 304, the application program 202 is preparing to provide communication services to a user of the computer 102. The application program 202 generates a contact list (i.e., presence information 108) request. The contact list catalogs users with whom the user of the user computer 102 may communicate and provides presence status for each user. The application program 202 delivers the request to the OCS gateway 204.

In block 306, the OCS gateway 204 receives the contact list request and converts the contact list to a command executable by the communication thread 112. The OCS gateway 204 stores the command in the OCS command data holder 206 in block 308. Storing the command may comprise acquiring exclusive access to the OCS command data holder 206 via a mutex, writing the command to a storage location, setting a pointer to the storage location containing the command, and releasing the mutex.

The command stored in the OCS command data holder 206 may indicate that the communication thread 112 should provide a return status response. In block 310, the OCS gateway client 210 polls the OCS command data holder 206 to determine when the return status response has been provided. When a return status is detected, the OCS gateway 204 retrieves and parses the status to determine whether further action, for example, error recovery, is indicated.

In block 312, the application program 202 continues to execute while awaiting delivery of the requested contact list. The contact list may be delivered to the application program 202 via a non-blocking message delivery mechanism, for example, a message queue or mailbox structure periodically checked for received messages.

Figure 4:
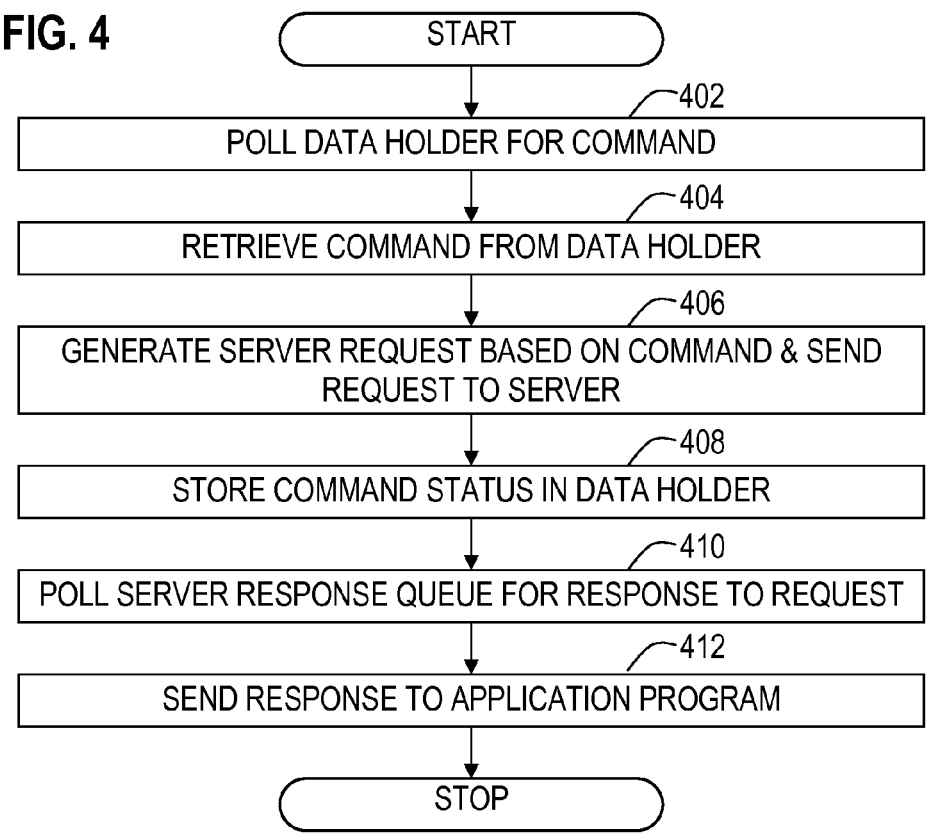
FIG. 4 shows a flow diagram for a method for using a communication thread to retrieve presence information from a server in accordance with various embodiments.

FIG. 4 shows a flow diagram for a method for using a communication thread 112 to retrieve presence information 108 from a server 106 in accordance with various embodiments. Though depicted sequentially as a matter of convenience, at least some of the actions shown can be performed in a different order and/or performed in parallel. Additionally, some embodiments may perform only some of the actions shown. At least some of the operations shown can be implemented as instructions provided in the communication thread 112 software executed by one or more processors included in the user computer 102.

In block 402, the communication thread 112 has been launched and is polling the command data holder 206 for commands. Polling the command data holder may involve obtaining exclusive access to the command data holder 206 and determining whether an array, list, or other storage structure configured to store commands or pointers to commands is empty. When the communication thread 112 detects a command (e.g., a command to obtain a contact list from the server 106) stored in the command data holder 206 for execution, the communication thread 112 retrieves the command in block 404. The communication thread 112 formulates a server 106 request based on the command, and sends the request to the server 106 via the network 110 in block 406.

In block 408, the communications thread 112 determines whether a status response should be provided to the application thread. If provision of a status return value is indicated (e.g., based on the retrieved command), the communication thread obtains exclusive access to the command data holder 206 and writes the status value to the command data holder 206 for retrieval by the OCS gateway 204. Status can include information regarding success or failure of command execution.

In block 410, the OCS gateway client 210 polls a message queue to determine whether the server 106 has responded to the request (e.g., by sending a contact list). When a response in detected, the communication thread 112 sends the response to the application program 202 via the OCS gateway worker 208.

The above discussion is meant to be illustrative of the principles and various embodiments of the present invention. Numerous variations and modifications will become apparent to those skilled in the art once the above disclosure is fully appreciated. For example, while interaction between a user computer 102, 104 and the server computer 106 is described in terms of a contact list request, those skilled in the art will understand that embodiments of the present disclosure are applicable to any interaction between a user computer 102, 104 and the server computer 106. It is intended that the following claims be interpreted to embrace all such variations and modifications.

What is claimed is:

1. A computer system, comprising: a processor; a memory coupled to the processor comprising a software system that when executed by the processor provides:
an application thread, the application thread comprising:
an application logic module, and
a communication server gateway module:
a server communication thread to provide non-blocking communication between the application thread and a communication server,
wherein the application logic module, when executed, causes the processor to generate a request for information stored on the communication server,
wherein the communication server gateway module, when executed, causes the processor to receive the information request and to generate a service command, based on the information request, the service command being configured for processing by the server communication thread; and
a command storage structure to provide information transfer between the application thread and the communication thread by storing and providing exclusive access to:
the service command generated by the communication server gateway module for processing by the server communication thread, and
a command status response passing from the server communication thread to the communication server gateway module,
wherein the server communication thread to process commands based on requests for communication server services generated by the application thread;
wherein the communication thread is to communicate with the communication server based on the commands and to block pending a server response, and the application thread is to execute unimpeded by the communication.

2. The computer system of claim 1, wherein the communication thread further comprises a gateway worker module to process information received from the communication server and to provide the information to the application logic module.

3. The computer system of claim 1, wherein the server communication thread is to determine a presence of a command in the command storage structure based on periodic polling of the command storage structure by the server communication thread and to determine a presence of information provided by the communication server based on polling a message queue to receive communication server provided information.

4. The computer system of claim 1, wherein the server is a Microsoft Office Communications Server and the server communication thread comprises a Microsoft Office Communications Server client.

5. The computer system of claim 1, wherein the software system when executed by the processor provides a plurality of server communication threads each to provide non-blocking communication between the application thread and one of a plurality of communication servers each to provide different types of user presence information, and wherein the application thread is to provide a communication session with a different computer system based on presence information received from the plurality of communication servers.

6. A method, comprising:
generating, by a processor, via execution of an application program in a primary thread, a request for a server to provide information;
storing, by the processor, a command in a command storage structure providing mutually exclusive access and accessible to the primary thread and a secondary thread, wherein the command is derived from the request;

generating, by the processor, via execution of a client program in a secondary thread, a query to the server based on the command;

receiving a response, by the processor, via execution of the secondary thread, from the server based on the query;

wherein the execution of the primary thread continues uninterrupted while the secondary thread generates the query and waits for the response.

7. The method of claim 6, further comprising converting, by the processor, the request to the command; wherein the command is executable by the client program executing in the secondary thread.

8. The method of claim 7, wherein the command storage structure provides bidirectional communication between the primary thread and the secondary thread.

9. The method of claim 6, further comprising storing in the command storage structure, by the processor, a status response indicative of errors in the execution of the command by the client program in the secondary thread.

10. The method of claim 6, further comprising:
polling, by the processor, via execution of the client program in the secondary thread, the command storage structure for the presence of a command, and a server response queue for a presence of response to the query; and
providing, by the processor, the response from the server received by the client in the secondary thread to the application program in the primary thread.

11. The method of claim 6, further comprising:
launching, by the processor, via execution of the primary thread, a plurality of secondary threads, each secondary thread to communicate with one of a plurality of servers; and
initiating, by the processor, via execution of the application program, a communication session based on presence information received from the plurality of servers.

12. A non-transitory computer-readable medium encoded with a computer program comprising:
instructions that when executed cause a processor to generate, via execution of an application program in a primary thread, a request for a server to provide user presence information;
instructions that when executed cause the processor to store a command in a command storage structure providing mutually exclusive access and accessible to the primary thread and a secondary thread, wherein the command is derived from the request;
instructions that when executed cause the processor to generate, via execution of a client program in a secondary thread, a query to the server based on the request;
instructions that when executed cause the processor to receive a response to the query, via execution of the secondary thread, from the server;
instructions that when executed cause the processor to provide uninterrupted execution of the primary thread while the secondary thread generates the query and waits for the response.

13. The computer-readable medium of claim 12, further comprising instructions that when executed cause the processor to convert the request to a command executable by the client executing in the secondary thread.

14. The computer-readable medium of claim 12, further comprising instructions that when executed cause the processor to bypass the command storage structure and provide the response to the query directly from the secondary thread to the primary thread.

15. The computer-readable medium of claim 12, further comprising instructions that when executed cause the processor to store in the command storage structure a status response indicative of whether an error occurred during the execution of the command by the client in the secondary thread.

16. The computer-readable medium of claim 12, further comprising instructions that when executed cause the processor to poll, via execution of the client in the secondary thread, the command storage structure for a presence of a command, and a server response queue for a presence of a response to the query.

17. The computer-readable medium of claim 12, further comprising instructions that when executed cause the processor to provide the response from the server received by the client in the secondary thread to the application program in the primary thread.

18. The computer-readable medium of claim 12, further comprising:
instructions that when executed cause the processor to launch a plurality of secondary threads each secondary thread to communicate with one of a plurality of servers; and
instructions that when executed cause the processor to initiate a communication session based on presence information received from the plurality of servers.

* * * * *